Dec. 20, 1949  R. K. VERMILLION ET AL  2,491,785
VISUAL ON AND OFF COURSE RADIO BEAM INDICATOR
Filed May 15, 1945  2 Sheets-Sheet 1
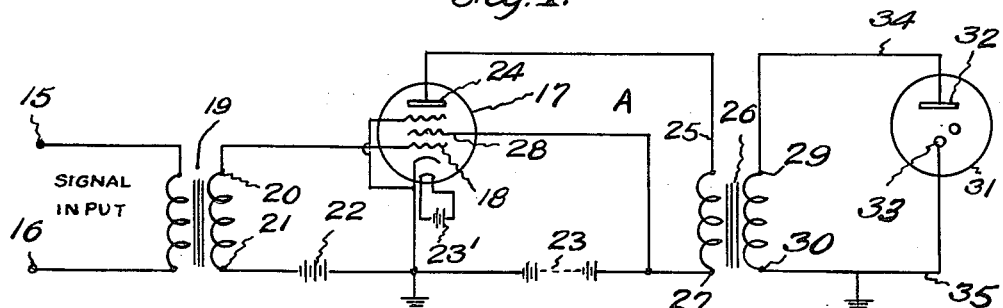
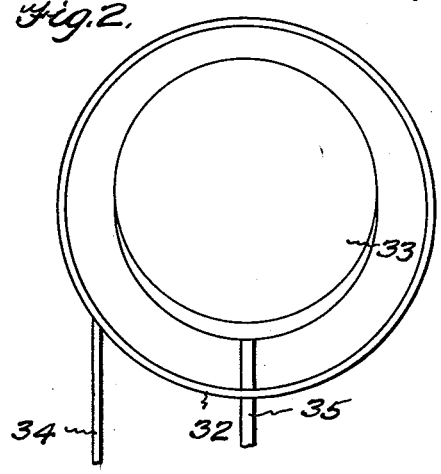
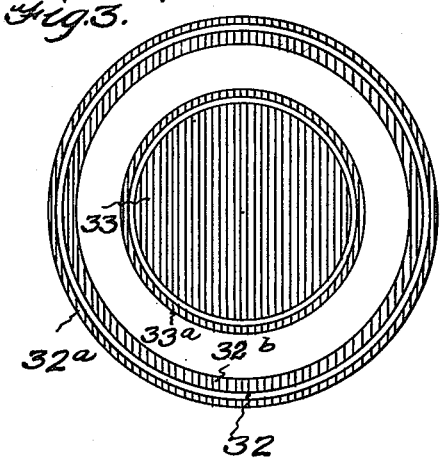
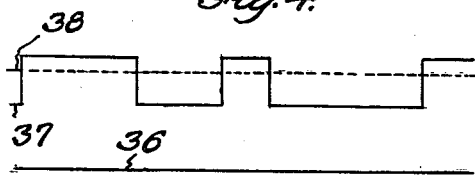
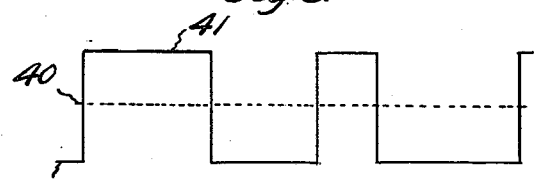
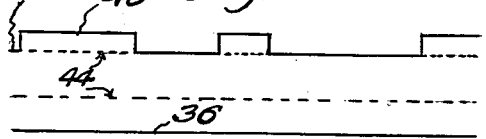
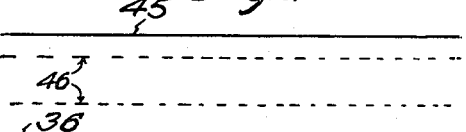
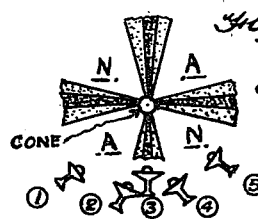
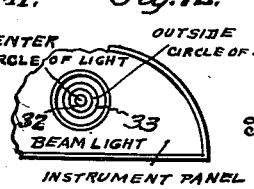
Inventor
RAYMOND K. VERMILLION AND
ROBERT J. CADWALLADER
By
Attorney

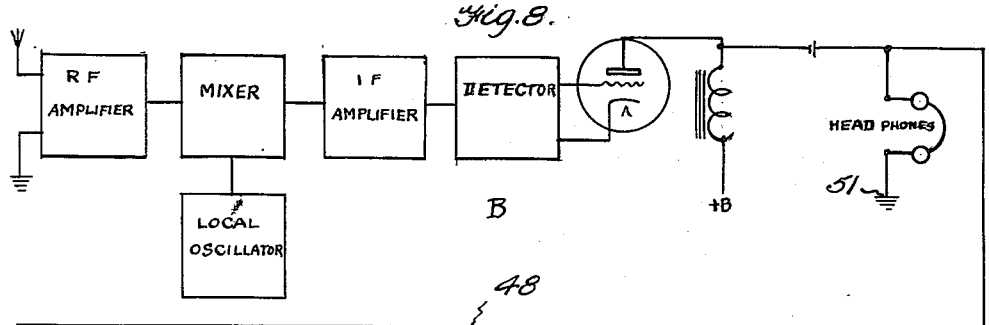
Fig. 8.
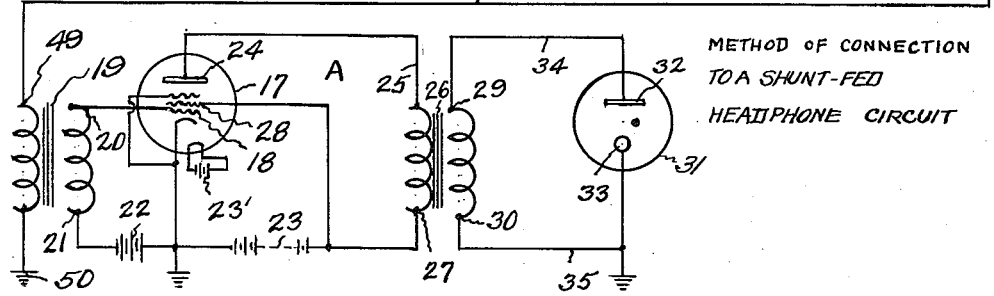
METHOD OF CONNECTION TO A SHUNT-FED HEADPHONE CIRCUIT
Fig. 9.
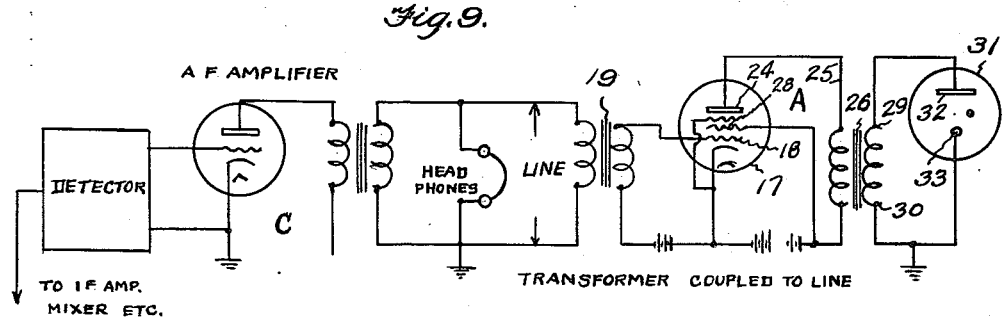
TRANSFORMER COUPLED TO LINE
Fig. 10.
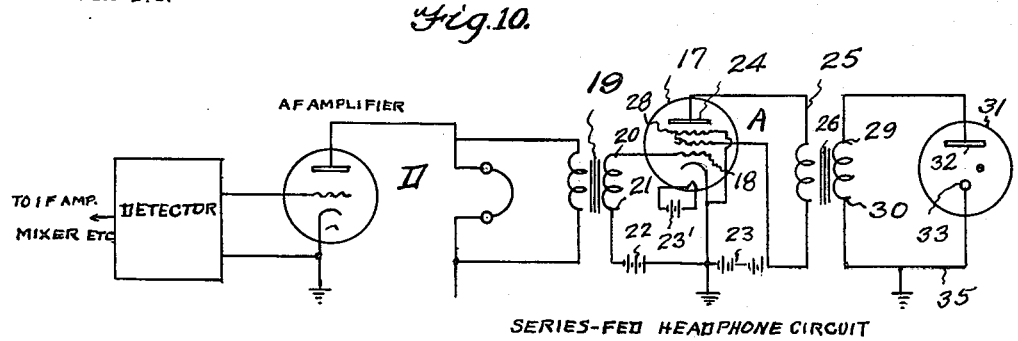
SERIES-FED HEADPHONE CIRCUIT
Inventors
RAYMOND K. VERMILLION AND
ROBERT J. CADWALLADER Patented Dec. 20, 1949

2,491,785

UNITED STATES PATENT OFFICE 2,491,785

VISUAL ON AND OFF COURSE RADIO
BEAM INDICATOR

Raymond K. Vermillion, Fort Walton, Fla., and
Robert J. Cadwallader, Long Beach, Calif.

Application May 15, 1945, Serial No. 593,830

2 Claims. (Cl. 343—110)

1

This invention relates to a system of translating aural radio course beam signals into visible signals, and has for one of its objects the production of a simple and efficient means whereby a pilot of an aircraft may be kept advised as to whether or not his craft is flying on or off the course by observing a gaseous glow or gaseous discharge lamp in which on-and-off course signals are reproduced visually.

Other objects and advantages of the present invention will appear throughout the following specification and claims.

In the drawings:

Figure 1 is a diagrammatic view of the basic circuit illustrating one of a number of methods of supplying a signal to the indicator;

Figure 2 is a view illustrating one type of indicator tube;

Figure 3 is a plan view of the indicator tube illustrating various glows which are present in the tube;

Figures 4 to 7 inclusive are diagrammatic views illustrating various signal conditions and points of tube operations;

Figure 8 is a diagrammatic view illustrating a method of connection of the present invention to a shunt-fed headphone circuit;

Figure 9 is a diagrammatic view illustrating the present invention with the transformer coupled to the line;

Figure 10 is a diagrammatic view of the present invention illustrating the method of connection to a series-fed headphone circuit;

Figure 11 is a diagrammatic view illustrating a radio beacon and showing planes approaching in different positions;

Figure 12 is a fragmentary front view of a portion of an instrument panel showing the glow lamp mounted thereon.

By referring particularly to the basic circuit A illustrated in Figure 1, it will be seen that this circuit is provided with connections 15 and 16 to be connected to a conventional radio receiver capable of receiving the desired signals, this connection being in place of the usual headphones or in shunt with them. A tube 17 is provided with a grid 18 and an audio frequency signal is fed to the grid 18 of the tube 17 through a transformer 19 via terminals 20 and 21. The grid 18 receives its bias from a battery 22. All elements of the vacuum tube 17 are connected as a conventional amplifier. Filament potential is supplied by a battery 23. The plate 24 of the vacuum tube 17 is connected to the terminal 25 of the transformer 26 and its circuit is completed via the terminal 27 to the plate battery 23 and screen grid 28 of the tube 17.

To the terminals 29 and 30 of the transformer 26, a cold cathode gaseous diode tube or glow lamp 31 is connected. The anode 32 of the tube 31 is connected to the terminal 29 and the cathode 33 is connected to the terminal 30. The cathode 33 is much larger in surface area than the anode 32. The cathode 33 is of the oxide-coated type resulting in a much lower ionizing potential. It has been found that a tube of a type having a disc cathode and a circular wire anode mounted around the cathode operates effectively.

In operation, an A. C. potential is applied to the tube. Due to unequal surface areas and the coated cathode which is used, the tube 31 acts as a rectifier. The anode 32 constitutes the positive terminal and the cathode 33 constitutes the negative terminal. Therefore, electrons flow from the cathode to the anode. Collision of the electrons with the atoms of the gas cause ionization and a glow results near the surface of the cathode 33. The glow present at the anode is very small at this stage and is barely visible or detectable. However, when the current or electron flow increases, resulting from the increase of the A. C. potential, the cathode glow therefore becomes increasingly visible and so does the anode glow, the anode glow spreading toward the cathode glow. At saturation, an arc is struck between the cathode 33 and anode 32. The range of operation therefore is from the cathode glow region through to the extended anode glow, but not to saturation. Due to the arc at saturation, the cathode 33 is sputtered and ruined.

In Figure 2, it will be noted that the relative placement of the anode 32 and its lead wire 34, in respect to the cathode 33 and its lead wire 35 is shown. In Figure 3 the two glows are illustrated, including the cathode 33, the cathode glow 33$^a$, and the anode 32 and the anode outer ring or glow 32$^a$. This view illustrates the stage where the anode glow is clearly visible. By increasing the A. C. potential, the inner ring or half of the anode glow or area 32$^b$ expands toward the cathode glow 33$^a$. In this manner a translation of audio frequency signals to visual signals has been accomplished.

In Figure 4, an on-and-off course signal in the N zone is shown. This represents a signal near the edge of the twilight zone. The line 36 designates the zero potential as a reference or base line. The line 37 designates the potential of cathode glow and the line 38 indicates the potential of the clearly visible anode glow blinking the letter N.

Figure 5 is a diagram representing an off course signal in the N zone, 39 indicating the zero potential, 40 the cathode glow, and 41 the clearly visible anode glow. The potential changes from zero to full anode glow, thus causing both anode and cathode to glow at the same time and also blinking the letter N.

Figure 6 is a diagram illustrating a signal very near the continuous signal zone. A small change in potential is present as indicated at 42 and 43. The region indicated by the numeral 44 is the cathode glow potential and is adjusted by the volume control of the receiver used with the apparatus, until the anode barely glows, as at point 42. The line 36 indicates the zero potential. The line 43 indicates the clearly visible anode glow blinking the letter N.

Figure 7 represents an on course signal, with a steady tone. The potential remains steady at a point indicated by the line 45, which is higher than the cathode glow 46 and the visible anode glow 47. The line 45 designates the clearly visible anode glow which extends towards the cathode. The line 36 indicates the zero potential.

As described above, the basic circuit illustrated in Figure 1 may be connected to a shunt-fed headphone circuit of the conventional type or a selected type, as shown in Figure 8. In this instance the transformer 19 is connected as shown to the headphone circuit B by means of the wire 48 which is connected at 49, one side of the transformer 19 being grounded, as at 50, and the headphone circuit being grounded, as at 51. It is thought unnecessary to describe in detail the headphone circuit, which may be of various types and constitutes no part of the present invention except as a means of furnishing signals to the basic circuit A. Figure 8 therefore illustrates only one type of assembly and method of connection of the basic circuit A to the shunt-fed headphone circuit, the various elements of the headphone circuit being properly identified by suitable legends.

Figure 9 shows the basic circuit A with the transformer coupled to the line of a headphone circuit of a type which may be used in connection with the present invention. The type of circuit C is merely an arbitrary selection for the purpose of illustration to show a further means of supplying signals to the basic circuit A.

In Figure 10, the basic circuit A is shown connected to a series-fed headphone circuit D through the transformer 19 of the circuit A. This too is an arbitrary selection to show a further means of supplying signals to the basic circuit where the on-and-off signals from circuits B, C, or D, are reproduced visibly in the tube 31 of the basic circuit A.

The amplifier serves three purposes: (1) Power amplification; (2) isolating the glow lamp from the radio receiver, preventing loading of the headphone circuit; (3) impedance matching, for instance from a 500 ohm headphone circuit.

It should be understood that other circuits might be adaptable for use in connection with the basic circuit A without departing from the spirit of the invention, and it is not desired to limit the present invention to the specific circuits illustrated, particularly the type of headphone circuits, but it is important that a gaseous cold cathode diode tube be used to accomplish the desired results.

The lamp or tube 31 is preferably mounted upon the instrument panel of an aircraft within the vision of the pilot where he may easily detect the variation of the intensity of the glow of the lamp 31. By referring to the illustration in Figures 11 and 12, the operation of the device should be understood when noting the positions of the planes 1 to 5 inclusive.

It should be noted when considering Figure 3 that the inside circle of light, of the lamp 31 such as is shown in the diagrammatic view Figure 1, includes the cathode 33 and the cathode glow 33$^a$. The outside circle of light surrounds the inside circle of light, and this outside circle of light constituting the cathode 32 includes an outer ring of light 32$^a$ and an inner ring of light 33 including the anode glow 32$^b$. Note Figure 11.

(1) When a plane is in No. 1 position, both the inside and outside circles of light flash the "Dot-Dash" signal A.

(2) When a plane is in No. 2 position, the "Twilight" zone, the inside circle retains a solid or constant glow, while the outside circle of light flashes the "Dot-Dash" signal A.

(3) When a plane is in No. 3 position, the on course section, both the inside and outside circles of light retain a solid glow.

(4) and (5) When a plane in either No. 4 or No. 5 position, the light displayed is the same as in positions 1 and 2 except that the light displays the N signal "Dash-Dot" instead of the A signal "Dot-Dash."

When a plane goes over the cone of silence, see Figure 11, a sharp drop in the intensity of the light is very evident.

Orientation of direction, with the lamp 31, is evidenced by a quick fade-out when going away from the station shown in Figure 11, or a quick build-up from a fade-out when going toward a station. It should be noted that the station identification signals are indicated by lamp 31 by dot-and-dash flashes similar to the audible dot-and-dash signals heard with earphones. The intensity of the glow of the lamp 31 may be controlled by the use of the volume control of the receiver. For instance the closer the approach to the station or radio beacon, the less intensity is necessary and the pilot, by noting the necessity of increasing or decreasing the intensity, will know that he is a greater distance from the station or is closely approaching the station. The basic circuit A, as stated above, is controlled from the type of headphone circuits such as illustrated in Figures 8, 9 and 10, having a volume of control or such modification thereof which may be available wherein a volume control is included in the headphone circuit.

Figures 8, 9 and 10 illustrate three selected methods of connection of the basic circuit A to various types of the particular circuits used in radio range receivers. The A. F. amplifier shown is contained in the receiver or receiving circuit and it not a copy of any particular radio range receiver but the drawing illustrates only a skeleton circuit. It is known that many different types of sets are manufactured and circuits in these sets may vary, many versions of the circuit being utilized for connection with headphones. The purpose of the present illustration however is to illustrate just how the basic circuit A may fit into or be used in conjunction with known or existing circuits.

*Circuit action of Figure 1.*—The output of a radio receiver is connected to terminals 15 and 16, said signal being a radio range signal. This signal consists of an audio frequency alternating current varying in amplitude if off course or constant amplitude if on course or in direct beam.

Transformer 19 is wound as a step-up transformer so that any signal impressed across terminals 15 and 16 appears as the same signal but greater in amplitude at terminals 20 and 21, this is governed by the ratio of the two windings.

Terminals 20 and 21 are connected to the grid 18 and cathode respectively of vacuum tube 17 in a conventional manner. Battery 22 supplies the proper grid bias to operate the tube 17 as a Class A1 amplifier. The vacuum tube shown is a pentode consisting of five elements, plate or anode 24, suppressor grid, screen grid 27, control grid 18 and cathode. A pentode is shown merely for illustration and it should be understood that any tube type capable of power amplification may be used. The purpose of the suppressor grid is to reduce secondary emission by its nearness to the anode. This grid is always much more negative than the anode due to bombardment and etc., in repelling the secondary emission these electrons are forced back to the anode, making the tube much more stable. In almost all of the power amplifiers this grid is connected internally in the tube and so it is believed, it is not necessary to include a description of its action. Any tube capable of audio frequency power amplification may be used. This includes the triode, tetrode and pentode.

Between the anode 24 (plate) and screen grid 28 is connected the primary winding of transformer 26 via terminals 25 and 27, and between the cathode and terminal 27 is connected the plate battery 23.

Upon application of a signal to the grid 18, the following takes place. It is understood that the signal is A. C. When the signal swings positive making the grid 18 less negative more plate current flows through terminals 27 and 25 to anode 24 and on to cathode thus setting up a greater magnetic flux in transformer 26. When the signal swings negative less current flows and less magnetic flux results.

A current is built up in the secondary of transformer 26 and appears as an amplified signal at terminals 29 and 30, the voltage of which is governed by the turns ratio of the two windings.

Terminals 29 and 30 are connected to the anode 32 and cathode 33 of a gaseous cold cathode diode sometimes called a phanotron. The current flow is from anode 32 to cathode 33 only when the anode 32 is positive; no flow takes place when the anode 32 is negative.

It should be noted that the present invention so far as is known at the present time, is the first visual indicator radio instrument which shows all of the different signals and signal variations on a single light bulb, which signals are sent out from an aircraft radio range finder. Furthermore, so far as is known, this is the first visual light indicating radio instrument which shows the null point on a loop direction finder instrument.

Having described the invention what is claimed as new is:

1. A system for translating aural radio course beam signals into visible signals comprising a signal input means for receiving incoming aural radio course beam signals from a signal pick-up circuit, said incoming signals being audio frequency alternating current signals having voltage and current amplitudes dependent upon the position of said signal pick-up circuit relative to the radio course beam signal source, means for amplifying the incoming signals, means for coupling said incoming signals into said amplifying means, means responsive to the amplified incoming signals displaying substantially first a single visible glow followed by a pair of visible glows as a voltage applied thereto is gradually increased from zero, and means for coupling the amplified incoming signals from said amplifying means to said responsive means.

2. A system for translating aural radio course beam signals into visible signals comprising a signal input means for receiving incoming aural radio course beam signals from a signal pick-up circuit, said incoming signals being audio frequency alternating current signals having voltage and current amplitudes dependent upon the position of said signal pick-up circuit relative to the radio course beam signal source, means for amplifying the incoming signals, means for coupling said incoming signals into said amplifying means, a cold gas tube having light elements responsive to the amplified incoming signals, one light element surrounding the other element thereby defining an inside and an outside element, the inside element comprising a cathode and a cathode glow, and the outside element comprising an anode and an anode glow, said light elements constituting means for displaying substantially first a single visible glow followed by a pair of visible glows as a voltage applied thereto is gradually increased from zero, means for coupling the amplified incoming signals from said amplifying means to said responsive means, and said responsive means consisting of a cold cathode gaseous diode tube having its cathode of the oxide-coated type and of a much greater area than its anode.

RAYMOND K. VERMILLION.
ROBERT J. CADWALLADER.

REFERENCES CITED

The following references are of record in the file of this patent:

UNITED STATES PATENTS

| Number | Name | Date |
|---|---|---|
| 1,976,397 | Holst | Oct. 9, 1934 |
| 2,033,723 | Marique | Mar. 10, 1936 |
| 2,208,921 | Busignies | July 23, 1940 |

OTHER REFERENCES

"Development of radio aids to navigation," pp. 10–13, by J. H. Dellinger et al., reprinted from the Proceedings of the Institute of Radio Engineers (IRE) for July 1928, pp. 900–903.